(12) United States Patent
Miyazaki

(10) Patent No.: US 7,707,316 B2
(45) Date of Patent: Apr. 27, 2010

(54) INFORMATION PROCESSING APPARATUS AND METHOD

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1645 days.

(21) Appl. No.: 10/488,014

(22) PCT Filed: Aug. 30, 2002

(86) PCT No.: PCT/JP02/08783

§ 371 (c)(1),
(2), (4) Date: Aug. 24, 2004

(87) PCT Pub. No.: WO03/019476

PCT Pub. Date: Mar. 6, 2003

(65) Prior Publication Data

US 2005/0005263 A1    Jan. 6, 2005

(30) Foreign Application Priority Data

Aug. 30, 2001 (JP) .............................. 2001-260846

(51) Int. Cl.
*G06F 15/16* (2006.01)
(52) U.S. Cl. .................... 709/246; 709/223; 709/224
(58) Field of Classification Search .................. 709/224, 709/225, 246; 704/2
See application file for complete search history.

(56) References Cited

U.S. PATENT DOCUMENTS 5,974,371 A * 10/1999 Hirai et al. .................... 704/2
2002/0143823 A1 * 10/2002 Stevens .................... 707/523

FOREIGN PATENT DOCUMENTS

| EP | 0 947 931 | 10/1999 |
| JP | 11-250037 | 9/1999 |
| JP | 2000-259650 | 9/2000 |
| JP | 2001-52016 | 2/2001 |
| JP | 2001-202450 | 7/2001 |
| WO | WO 01/13267 | 2/2001 |

* cited by examiner

*Primary Examiner*—Rupal D Dharia
*Assistant Examiner*—Adnan Mirza
(74) *Attorney, Agent, or Firm*—Frommer Lawrence & Haug LLP; William S. Frommer; Thomas F. Presson

(57) ABSTRACT

An information processing apparatus and method adapted to automatically convert contents edited by a user into a description language that is independent of platforms. Personal computers execute authoring software, convert the contents edited by the user into a markup language document, and transmit it to a server via the Internet. The server stores the markup language document supplied from the personal computer into a HDD and executes a markup language processing processor to develop the markup language document into a markup language document tree structure, which is stored in the HDD.

8 Claims, 14 Drawing Sheets

F I G. 5

```
<?xml version="1.0" encoding="shift_jis"?>
<?xml-stylesheet type="text/css" href="ziml_sample.css"?>
<!DOCTYPE interface>

<interface xmlns:html="http://www.w3.org/TR/REC-html40"
xmlns="http://ziml.aaaa.co.jp/ziml-dtd">

<ziml>

<view>
<view-node id="1" view-factor="design"/>
<view-node id="2" view-factor="design"/>
<view-node id="3" view-factor="design"/>
</view>

<macrocosm>
<universe>
<node id="1" object-type="image" contents-type"image/jpg"
data=url("http://ziml.aaaa.co.jp/data/genre1.jpg") focus="got_focus" keyword="pops"/>
<node id="2" object-type="image" contents-type"image/jpg"
data=url("http://ziml.aaaa.co.jp/data/genre2.jpg") focus="lost_focus" keyword="rock"/>
<node id="3" object-type="image" contents-type"image/jpg"
data=url("http://ziml.aaaa.co.jp/data/genre3.jpg") focus="lost_focus" keyword="jazz"/>
<node id="4" object-type="image" contents-type"image/jpg"
data=url("http://ziml.aaaa.co.jp/data/genre4.jpg") focus="lost_focus" keyword="classic"/>
</universe>

<universe>
<node id="5" object-type="image" contents-type"image/gif"
data=url("http://ziml.aaaa.co.jp/data/duppy1.gif") focus="got_focus" keyword="duppy"/>
<node id="6" object-type="image" contents-type"image/gif"
data=url("http://ziml.aaaa.co.jp/data/duppy2.gif") focus="lost_focus" keyword="duppy"/>
<node id="7" object-type="image" contents-type"image/gif"
data=url("http://ziml.aaaa.co.jp/data/duppy3.gif") focus="lost_focus" keyword="duppy"/>
<node id="8" object-type="image" contents-type"image/gif"
data=url("http://ziml.aaaa.co.jp/data/duppy4.gif") focus="lost_focus" keyword="duppy"/>
<node id="9" object-type="image" contents-type"image/gif"
data=url("http://ziml.aaaa.co.jp/data/kuraki.gif") focus="got_focus" keyword="kuraki"/>
<node id="10" object-type="image" contents-type"image/gif"
data=url("http://ziml.aaaa.co.jp/data/hirai.gif") focus="lost_focus" keyword="hirai"/>
<node id="11" object-type="image" contents-type"image/gif"
data=url("http://ziml.aaaa.co.jp/data/spick.gif") focus="lost_focus" keyword="spick"/>
<node id="12" object-type="image" contents-type"image/gif"
data=url("http://ziml.aaaa.co.jp/data/19.gif") focus="lost_focus" keyword="19"/>
<node id="13" object-type="image" contents-type"image/gif"
data=url("http://ziml.aaaa.co.jp/data/qube.gif") focus="lost_focus" keyword="qube"/>
</universe>
</macrocosm>
```

F I G. 11

```
<!-- ******* FRAME01 ****** -->
<frame picture="f02_01.bmp" x="150" y="50" scale="1.000000">
    <action>
        <transformAction x="0" y="50" scale="2.000000" duration="200" animationType="&LINEAR;" wait="50" repeat="1"/>
        <transformAction x="50" y="100" scale="0.750000" duration="50" animationType="&SISO;" wait="0" repeat="1"/>
    </action>
</frame>
```

INFORMATION PROCESSING APPARATUS AND METHOD

TECHNICAL FIELD

The present invention relates generally to an information processing apparatus and method and, more particularly, to an information processing apparatus and method adapted to automatically convert contents edited by a user into a platform-independent description language.

BACKGROUND ART

Conventionally, in the software development in built-in system, there exists a variety of program codes dependent on platforms and program languages.

Recently, information sites in which contents such as music data and image data can personally be received without restriction exist on networks including the Internet.

However, the related-art technologies present a problem that the software developed on built-in systems can be re-used no more if devices or operation systems of these built-in systems are changed.

In the case where image data is received from information sites that manage contents, platform-dependent data conversion is required, thereby presenting a problem of complicating the contents delivery between users.

DISCLOSURE OF INVENTION

The present invention has been made in view of the above, and it is an object of the present invention to automatically convert contents edited by a user into a description language that is independent of platforms.

According to the present invention, there is provided an information processing apparatus including: editing means for editing contents; converting means for converting, when storing the contents edited by the editing means, converting the contents into a predetermined description language; and storage means for storing the contents written in the predetermined description language, the contents being converted by the converting means.

In the above-mentioned information processing apparatus, the editing means can hold an editing history for the contents and the converting means can convert the editing history held in the editing means into the predetermined description language.

The above-mentioned information processing apparatus, further including: transmitting means for transmitting the contents written in the predetermined description language stored in the storage means to another information processing apparatus.

The above-mentioned information processing apparatus, still further including: translating means for requesting another information processing apparatus for the distribution of the contents, receiving the predetermined description language developed into a tree structure from the another information processing apparatus, and translating the received predetermined description language into a predetermined program code; and display means for executing the predetermined program code obtained by the translating means to display the corresponding contents.

In the above-mentioned information processing apparatus, the predetermined description language is an XML language.

Further, according to the present invention, there is provided an information processing method including the steps of: editing contents; converting, when storing the contents edited by the editing step, converting the contents into a predetermined description language; and controlling the storage of the contents written in the predetermined description language, the contents being converted by the converting step.

According to the present invention, there is provided a recording medium recording a computer-readable program including: editing contents; converting, when storing the contents edited by the editing step, converting the contents into a predetermined description language; and controlling the storage of the contents written in the predetermined description language, the contents being converted by the converting step.

According to the present invention, there is provided a program for having a computer execute the steps of: editing contents; converting, when storing the contents edited by the editing step, converting the contents into a predetermined description language; and controlling the storage of the contents written in the predetermined description language, the contents being converted by the converting step.

According to the present invention, there is provided an information processing system having an information processing apparatus for editing contents and an information distribution apparatus for distributing the contents, the information processing apparatus including: editing means for editing contents; converting means for converting, when storing the contents edited by the editing means, converting the contents into a predetermined description language; and transmitting means for transmitting the contents written in the predetermined description language to the information distribution apparatus, the information distribution apparatus including: storage means for receiving and storing the contents written in the predetermined description language sent from the information processing apparatus; developing means for developing the stored contents written in the predetermined description language stored in the storage means into a tree structure; and distributing means for distributing the contents written in the predetermined description language having the tree structure developed by the developing means to the information processing apparatus.

The information processing apparatus further includes: translating means for receiving the predetermined description language developed into a tree structure from the information distribution apparatus and translating the received predetermined description language into a predetermined program code; and display means for executing the predetermined program code obtained by the translating means to display the corresponding contents.

In the information processing apparatus and method and the program according to the invention, when editing contents and storing the edited contents, the contents are converted into a predetermined description language and the contents written in this predetermined description language is stored.

In the information processing system according to the invention, when editing contents and storing the edited contents in an information processing apparatus, the contents is converted into a predetermined description language, the contents written in the predetermined description language is sent to an information distribution apparatus, the contents written in the predetermined description language sent from the information processing apparatus is received and stored by the information distribution apparatus, the stored contents written in the predetermined description language is developed into a tree structure, and the contents written in the predetermined description language having this tree structure is distributed to the information processing apparatus.

BRIEF DESCRIPTION OF DRAWINGS

FIG. 5 is a diagram illustrating an exemplary data description format resulted when contents of edited contents is converted into a markup language document.

FIG. 11 is a diagram illustrating an exemplary markup language document (a part).

BEST MODE FOR CARRYING OUT THE INVENTION

A preferred embodiment of the present invention is explained with reference to the accompanying drawings.

Figure 1:
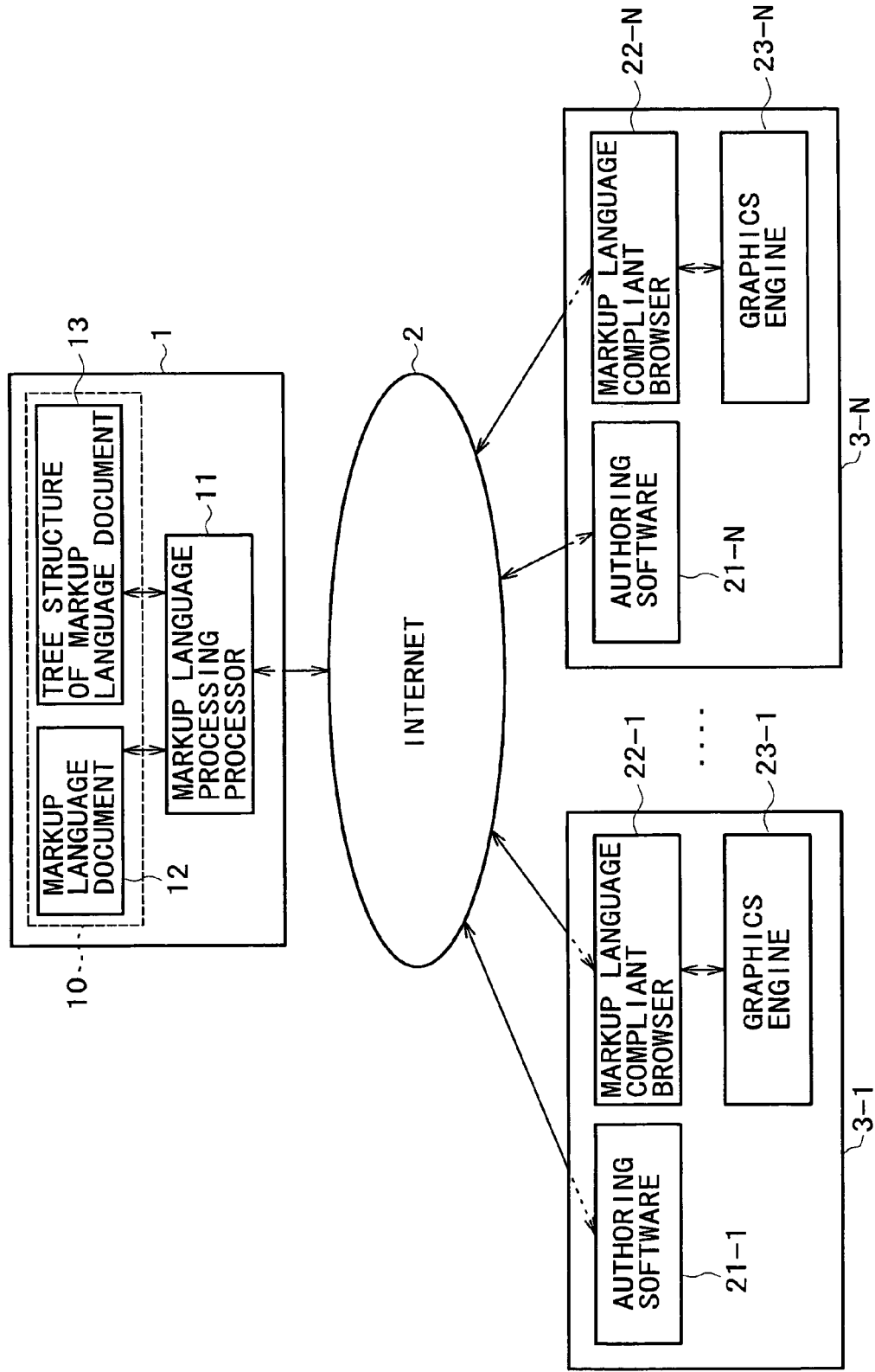
FIG. 1 is a block diagram illustrating an exemplary configuration of a contents editing/distributing system to which the present invention is applied.

Now, referring to FIG. 1, there is shown an exemplary configuration of a contents editing/distributing system to which the present invention is applied. In this contents editing/distributing system, a server 1 is connected to the Internet 2 and personal computers 3-1 through 3-N (hereafter generically referred to simply as a personal computer 3 unless it is required to make distinction between the personal computers 3-1 through 3-N) are also connected to the Internet 2.

The server 1 stores a document 12 of markup language format (hereafter referred to as a markup language document 12) supplied from a personal computer 3 via the Internet 2 into a hard disk drive (HDD) 10.

The document of a markup language (ZIML: Zooming Interface Markup Language) denotes a document written in XML (extensible Markup Language) or XSL (extensible Stylesheet Language) for example.

On the basis of an operation done by the manager of the server 1, the server 1 executes a markup language processing processor 11 to read the markup language document 12 from the hard disk drive 10 and develops this markup language document into a tree structure. The markup language document developed into a tree structure (hereafter referred to as a markup language document tree structure 13 is stored in the hard disk drive 10.

If the distribution of a markup language document is requested from the personal computer 3, the server 1 reads the corresponding markup language document tree structure 13 from the hard disk drive 10 and distributes it to the personal computer 3 via the Internet 2.

Figure 3:
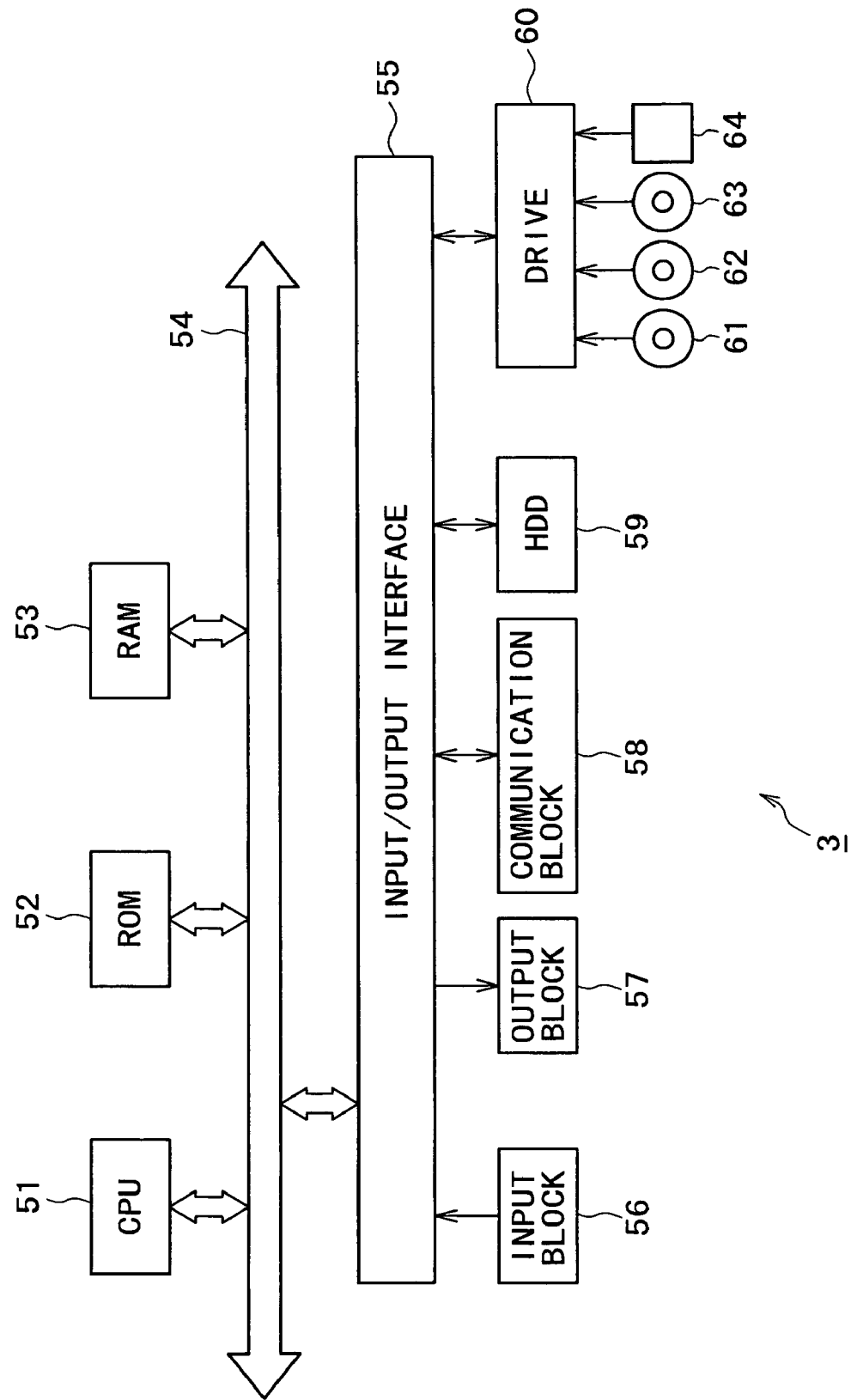
FIG. 3 is a diagram illustrating an exemplary configuration of a personal computer shown in FIG. 1.

On the basis of a user operation, the personal computers 3-1 through 3-N execute authoring software 21-1 through 21-N respectively to convert the user-edited contents (namely, multimedia information including images, graphics and text for example) into a markup language document and stores it into a hard disk drive 59 (FIG. 3). Also, the personal computers 3-1 through 3-N may input the contents edited by use of a general-purpose application into the authoring software 21-1 through 21-N respectively to convert the contents into a markup language document.

On the basis of a user operation, the personal computers 3-1 through 3-N send the markup language document stored in the hard disk drive 59 to the server 1 via the Internet 2.

On the basis of a user operation, the personal computers 3-1 through 3-N execute markup language compliant browsers 22-2 through 22-N respectively to request the server 1 via the Internet 2 for the distribution of contents.

The markup language compliant browser as used herein is an HTML (Hyper Text Markup Language) browser or a BML (Broadcast Markup Language) browser for example.

The personal computers 3-1 through 3-N receive the markup language document tree structure 13 from the server 1 and translates it into the program codes suitable to graphics engines 23-1 through 23-N respectively. The translated program codes are displayed on an output block 57 (FIG. 3) based on a display device for example by the graphics engines 23-1 through 23-N respectively.

It should be noted that, in the example of FIG. 1, one unit of the server 1 is connected to the Internet 2; it will be apparent that two or more units of server 1 may be connected to the server 1.

In what follows, the authoring software 21-1 through 21-N will be generically referred to as authoring software 21 unless otherwise specified, the markup language compliant browsers 22-1 through 22-N will be generally referred to as the markup language compliant browser 22 unless otherwise specified, and the graphics engines 23-1 through 23-N will be generically referred to as the graphics engine 23 unless otherwise specified.

Figure 2:
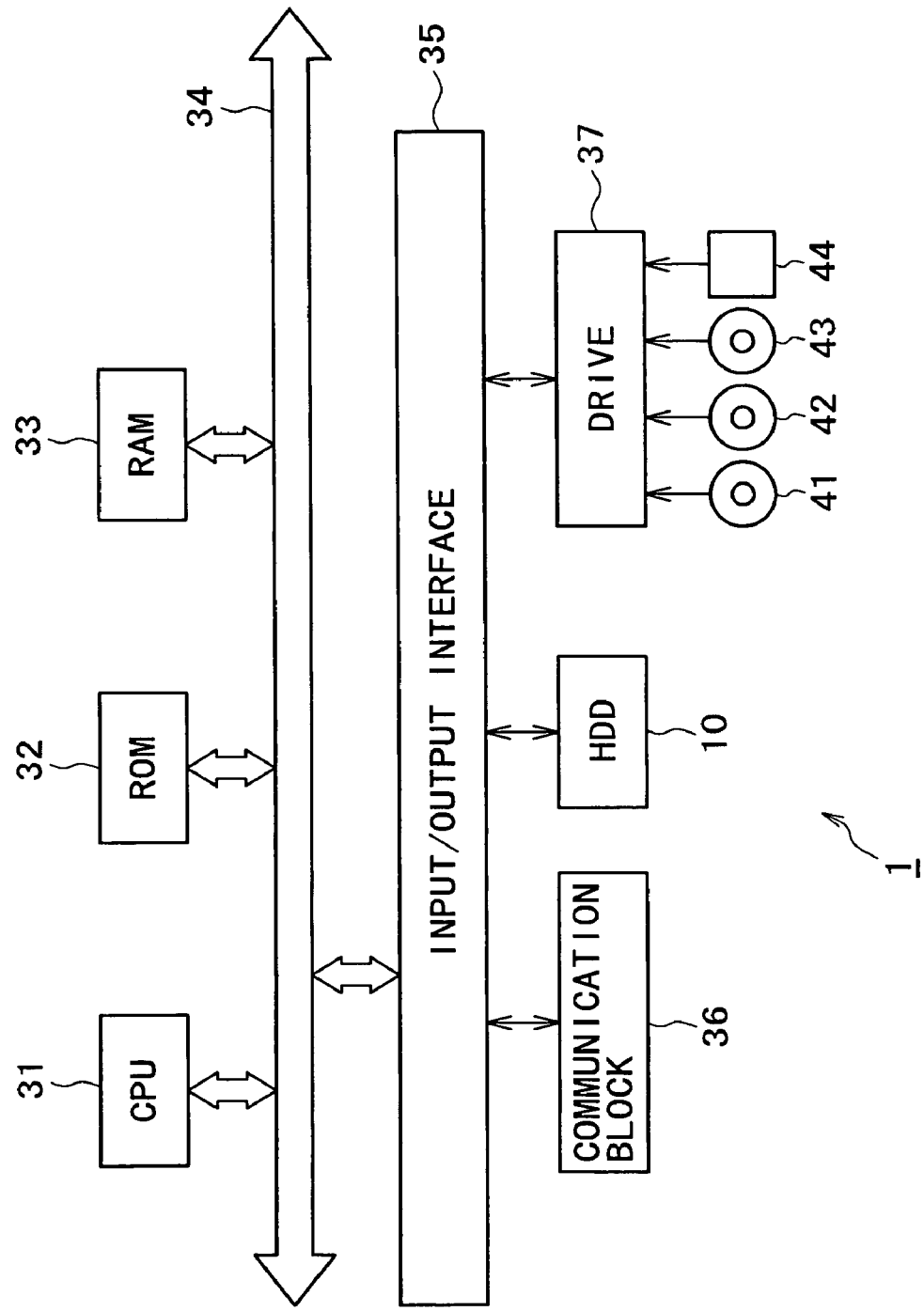
FIG. 2 is a block diagram illustrating an exemplary configuration of a server shown in FIG. 1.

Referring to FIG. 2, there is shown a block diagram illustrating an exemplary configuration of the server 1.

A CPU (Central Processing Unit) 31 executes various processing operations as instructed by programs stored in a ROM (Read Only Memory) 32 or programs loaded from the hard disk drive 10 into a RAM (Random Access Memory) 33. These programs include the markup language processing processor 11. The RAM 33 also stores, from time to time, data necessary for the execution by the CPU 31 of the above-mentioned various processing operations.

The CPU 31, the ROM 32, and the RAM 33 are interconnected via a bus 34. This bus 34 is also connected to an input/output interface 35.

The input/output interface 35 is connected to a communication block 36 based on a modem and a terminal adaptor and the hard disk drive 10 in which markup language documents 12 processed by the markup language processing processor 11 and markup language document tree structures 13 are stored. The communication block 36 executes communication processing via networks including the Internet 2.

The input/output interface 35 is also connected to a drive 37 as required, on which a magnetic disk 41, an optical disk 42, a magneto-optical disk 43, or a semiconductor memory 44 is appropriately loaded, computer programs read therefrom being installed into the hard disk drive 10 as required.

Referring to FIG. 3, there is shown a block diagram illustrating an exemplary configuration of the personal computer 3.

A CPU 51 executes various processing operations as instructed by programs stored in a ROM 52 or programs loaded from the hard disk drive 59 into a RAM 53. These programs include a markup language compliant browser 22 and a graphics engine 23. The RAM 53 also stores, from time to time, data necessary for the execution by the CPU 51 of the above-mentioned various processing operations.

The CPU 51, the ROM 52, and the RAM 53 are interconnected via a bus 54. This bus 54 is also connected to an input/output interface 55.

The input/output interface 55 is connected to an input block 56 composed of buttons, switches, a keyboard, and a mouse for example, an output block 57 composed of a CRT (Cathode Ray Tube) or an LCD (Liquid Crystal Display) and a speaker, a communication block 58 composed of a modem and a terminal adaptor, and a hard disk drive 59. The communication block 58 executes communication processing via networks including the Internet 2.

The input/output interface 55 is also connected to a drive 60 as required, on which a magnetic disk 61, an optical disk 62, a magneto-optical disk 63, or a semiconductor memory 64 is appropriately loaded, computer programs read therefrom being installed into the hard disk drive 59 as required.

The following describes contents editing to be executed on the authoring software 21 of the personal computer 3.

When the user gives an instruction to start the authoring software 21 by operating the input block 56, the CPU 51 loads the authoring software 21 from the ROM 52 on the basis of an input signal corresponding to the user operation supplied from the input block 56 and executes the loaded authoring software 21. Consequently, a contents editing screen as shown in FIG. 4 is displayed on the output block 57.

Figure 4:
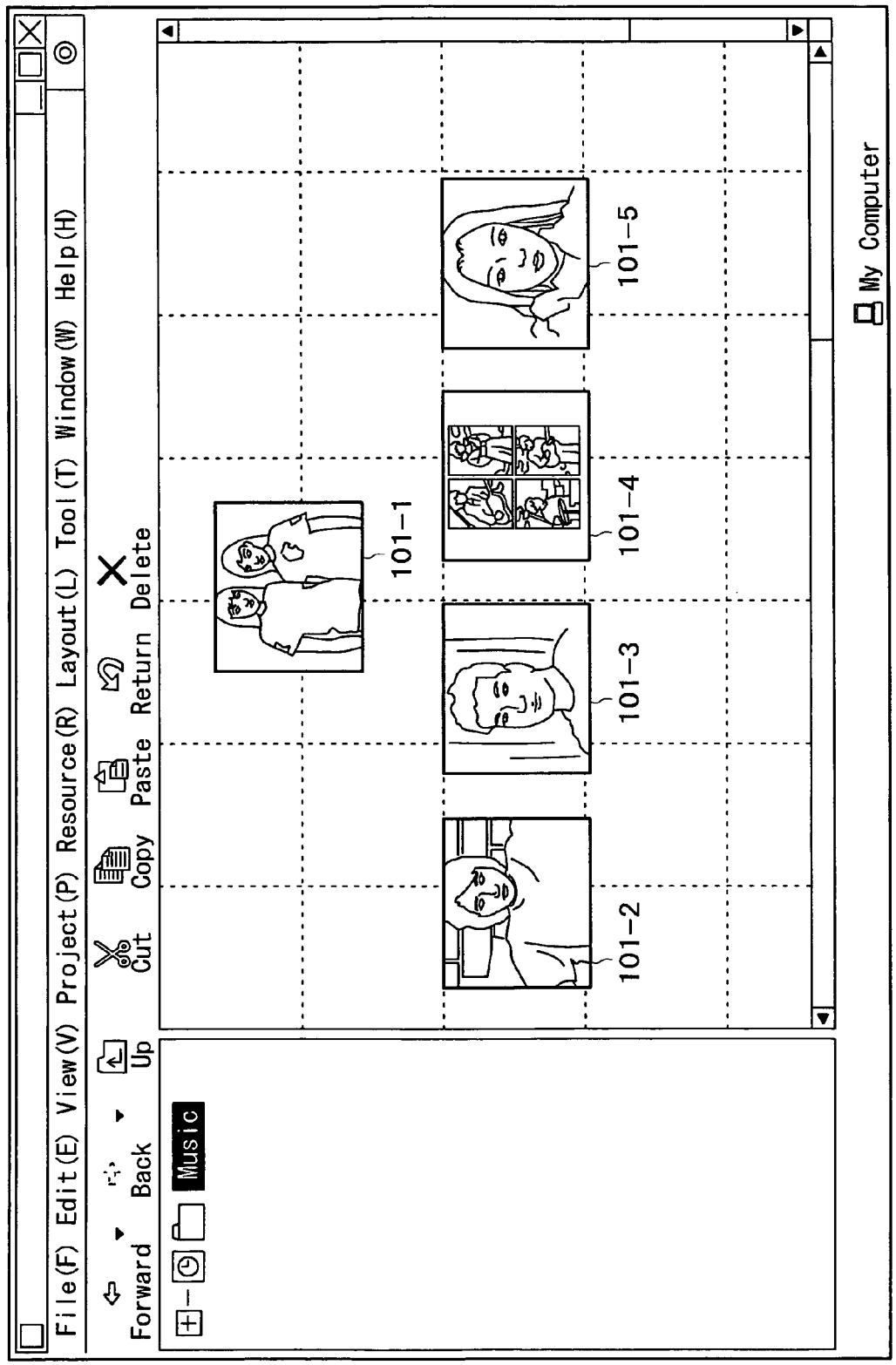
FIG. 4 is a diagram illustrating an exemplary display of a contents editing screen.

Next, when the user gives an instruction to store the contents data by editing (laying out) contents 101-1 through 101-5 as shown in FIG. 4, the CPU 51 which is executing the authoring software 21 automatically converts the edited contents data into a markup language document (for example, an XML document) on the basis of an input signal corresponding to the user operation supplied from the input block 56 and stores this markup language document into the hard disk drive 59.

Referring to FIG. 5, there is shown an example of a data description format (DTD: Document Type Definition) as it is when the contents of content editing are converted into a markup language document.

<?xml version="1.0" encoding="shift_jis"?> on line 1 denotes that the version of XML language is 1.0 and encoding is based on shift JIS. <?xml-stylesheet type="text/css" href="ziml_sample.css"?> on line 2 denotes that the style specification language of XML language is made up of text or css (Cascading Style Sheets) and the data to be linked are a ziml_sample.css description file. <!DOCTYPE interface> on line 3 denotes that the document type is an interface description language.

<interface xmlns:html="http://www.w3.org/TR/REC-html40" xmlns="http://ziml.aaaa.co.jp/ziml-dtd"> on lines 4 and 5 denotes that the data indicated by the interface description language exist in URL (Uniform Resource Locator) http://www.w3.org/TR/REC-html40 and the data indicated by a ZIML document (markup language document) exist in the URL of xmlns="http://ziml.aaaa.co.jp/ziml-dtd.

<ziml> on line 6 denotes the root element which delimits the entire ZIML document.

In a range from <view> on line 7 to </view> on line 11, the description about one or more view nodes is made. <viewnode id="1" view-factor="design"/> on line 8 denotes that the ID of view element which is a screen display status is "1" and the condition of selecting a node to be displayed in the view is "design" (which explicitly specifies a node by style description). Likewise, lines 9 and 10 denote that the ID of view element is 2 and 3 respectively and the condition for selecting a node is "design".

In a range from <macrocosm> on line 12 to </macrocosm> on line 43, the description of one or more universe elements is made. In a range from <universe> on line 13 to </universe> on line 22 and in a range from <universe> on line 23 and </universe> on line 42, the description of one or more node elements is made.

<node id="1" object-type="image" contents-type="image/jpg" data=url("http://ziml.aaaa.co.jp/data/genre1.jpg") focus="got_focus"keyword="pops"/> on lines 14 and 15 denotes that the ID of the node shown in view is "1", the type of drawing object representative of the node is "image object" (image), the type of contents indicative of the drawing object representative of node is "JPEG" (Joint Photographic Experts Group), the data indicated by the drawing object representative of node exist in URL http://ziml.aaaa.co.jp/data/genre1.jpg, there is a focus (got_focus) for the drawing object representative of node, and the keyword of information included in node is "pops".

Likewise, on lines 16 and 17, the ID of node is "2", the type of drawing object is "image" object, the type of contents is "JPEG", the data indicated by the drawing object exist in URL http://ziml.aaaa.co.jp/data/genre2.jpg, there is no focus (lost_focus) for the drawing object, and the keyword is "rock".

On lines 18 and 19, the ID of node is "3", the type of drawing object is "image" object, the type of contents is "JPEG", the data indicated by the drawing object exist in URL http://ziml.aaaa.co.jp/data/genre3.jpg, there is no focus for drawing object, and the keyword is "jazz".

On lines 20 and 21, the ID of node is "4", the type of drawing object is "image" object, the type of contents is "JPEG", the data indicated by drawing object exist in URL http://ziml.aaaa.co.jp/data/genre4.jpg, there is no focus for drawing object, the keyword is classical "classic".

On lines 24 and 25, the ID of node is "5", the type of drawing object is "image" object, the type of contents is GIF (Graphics Interchange Format), the data indicated by drawing object exist in URL http://ziml.aaaa.co.jp/data/duppy1.gif, there is a focus for drawing object, and the keyword is "duppy".

On lines 26 and 27, the ID of node is "6", the type of drawing object is "image" object, the type of contents is GIF, the data indicated by drawing object exist in URL http://ziml.aaaa.co.jp/data/duppy2.gif, there is no focus for drawing object, and the keyword is "duppy".

On lines 28 and 29, the ID of node is "7", the type of drawing object is "image" object, the type of contents is "GIF", the data indicated by drawing object exist in URL http://ziml.aaaa.co.jp/data/duppy3.gif, there is no focus for drawing object, and the keyword is "duppy".

On lines 30 and 31, the ID of node is "8", the type of drawing object is "image" object, the type of contents is "GIF", the data indicated by drawing object exist in URL http://ziml.aaaa.co.jp/data/duppy4.gif, there is no focus for drawing object, and the keyword is "duppy".

On lines 32 and 33, the ID of node is "9", the type of drawing object is "image" object, the type of contents is "GIF", the data indicated by drawing object exist in URL http://ziml.aaaa.co.jp/data/kuraki.gif, there is a focus for drawing object, and the keyword is "kuraki".

On lines 34 and 35, the ID of node is "10", the type of drawing object is "image" object, the type of contents is "GIF", the data indicated by drawing object exist in URL http://ziml.aaaa.co.jp/data/hirai.gif, there is no focus for drawing object, and the keyword is "hirai".

On lines 36 and 37, the ID of node is "11", the type of drawing object is "image" object, the type of contents is "GIF", the data indicated by drawing object exist in URL http://ziml.aaaa.co.jp/data/spick.gif, there is no focus for drawing object, and the keyword is "spick".

On lines 38 and 39, the ID of node is "12", the type of drawing object is "image" object, the type of contents is "GIF", the data indicated by drawing object exist in URL http://ziml.aaaa.co.jp/data/19.gif, there is no focus for drawing object, and the keyword is "19".

On lines 40 and 41, the ID of node is "13", the type of drawing object is "image" object, the type of contents is "GIF", the data indicated by drawing object exist in URL http://ziml.aaaa.co.jp/data/qube.gif, there is no focus for drawing object, and the keyword is "qube".

Thus, the contents are converted into a markup language document and stored in the hard disk drive 59.

When the user gives an instruction to send the markup language document from the hard disk drive 59 to the server 1 by operating the input block 56 of the personal computer 3, the CPU 51 reads the markup language document from the hard disk drive 59 as instructed by the user operation and sends the markup language document to the server 1 via the communication block 58 and the Internet 2.

The server 1 receives the markup language document 12 supplied from the personal computer 3 via the Internet 2 and stores the received markup language document 12 into the hard disk drive 10. Then, when the markup language processing processor 11 is executed by the manager of the server 1, the markup language document 12 is read from the hard disk drive 10 to be developed into the markup language document tree structure 13.

Figure 6:
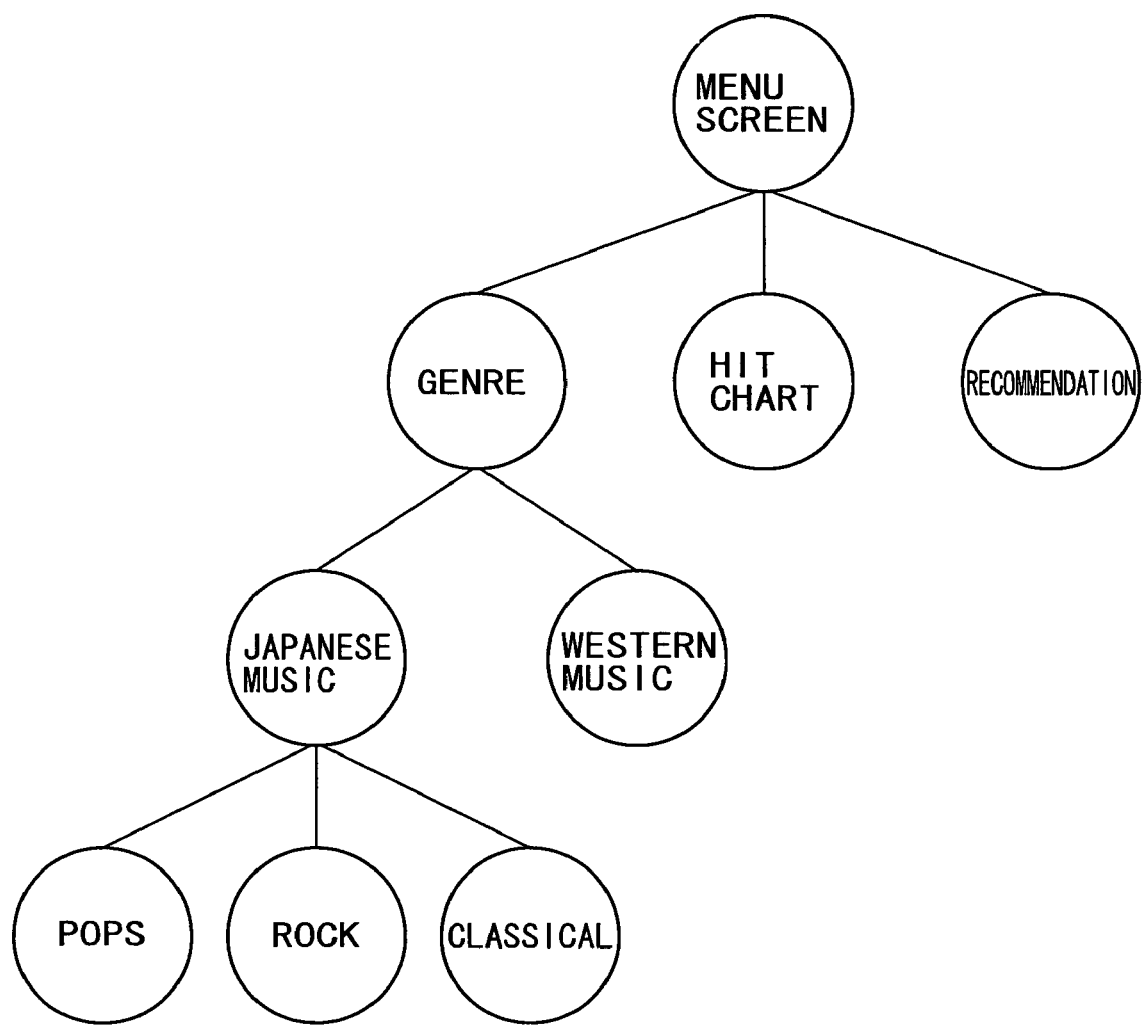
FIG. 6 is a diagram illustrating an exemplary tree structure of a markup language document.

Referring to FIG. 6, there is shown an example of the markup language document tree structure 13.

In the example shown in FIG. 6, tags (elements) "genre", "hit chart", and "recommendation" are linked to tag "menu screen" which is the topmost entry. Tag "genre" is linked down to tags "Japanese music" and "Western music". Tag "Japanese music" is linked down to tags "pops", "rock", and "classical".

Thus, the markup language document 12 stored in the hard disk drive 10 is developed into a tree structure by the markup language processing processor 11 to be stored, as the markup language document tree structure 13, in a different storage area than that of the markup language document 12.

When the user of the personal computer 3 executes the markup language compliant browser 22 by operating the input block 56 to request the Internet 2 for the distribution of contents, the Internet 2 reads the corresponding markup language document tree structure 13 from the hard disk drive 10 and distributes the markup language document tree structure 13 to the personal computer 3 via the Internet 2.

The personal computer 3 gets (receives) the markup language document tree structure 13 supplied from the server 1 via the Internet 2 and translates it into a program code suitable for the graphics engine 23, displaying the resultant program code on the output block 57 constituted by a display device for example.

Thus, the contents edited by the user as desired by use of the authoring software 21 is automatically converted into a markup language document, which is sent to the server 1 to be developed into a tree structure. Therefore, the server 1 can provide common contents (the markup language document tree structure 13) to the user independently of platforms. Namely, the personal computer 3 can distribute the contents edited by use of the authoring software 21 via the server 1 without restriction.

Figure 7:
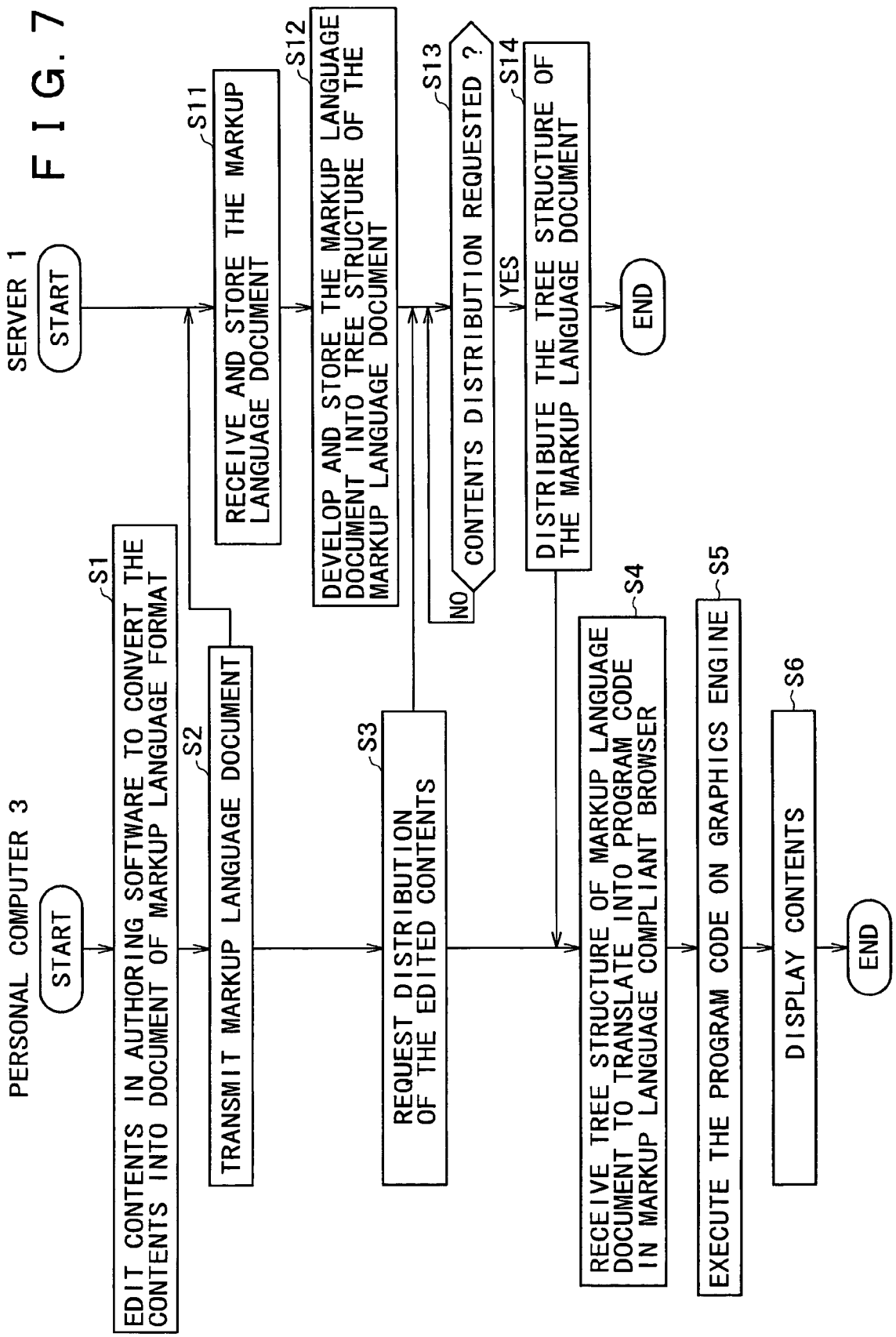
FIG. 7 is a flowchart describing the processing from the editing of contents and the distribution thereof.

The following describes the processing ranging from the editing contents and the distribution of the edited contents with reference to the flowchart shown in FIG. 7.

Figure 8:
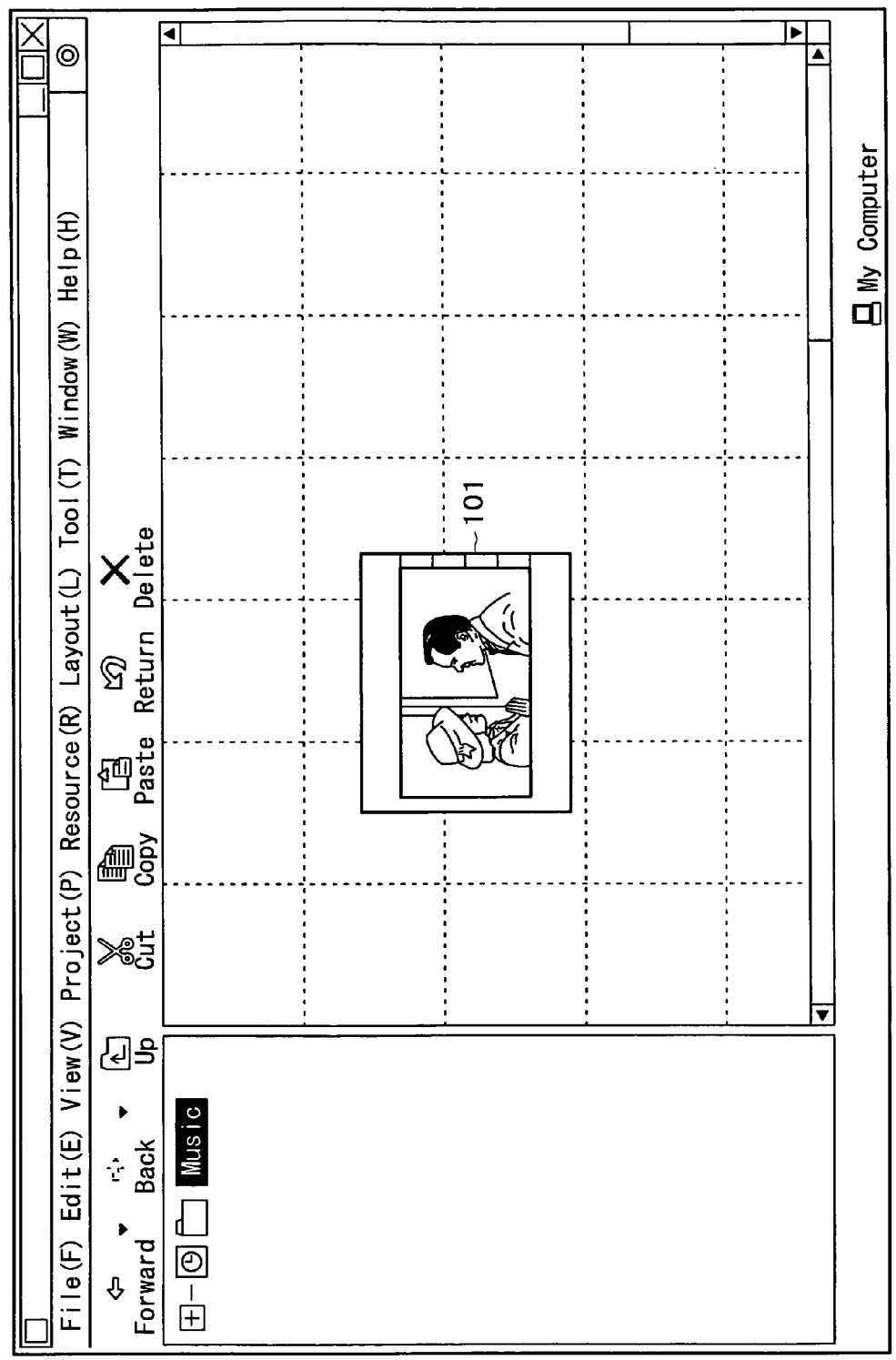
FIG. 8 is a diagram illustrating an exemplary display of a contents editing screen.

In step S1, the CPU 51 of the personal computer 3 loads the authoring software 21 from the ROM 52 to execute it as instructed by the user. Consequently, the a contents editing screen as shown in FIG. 8 for example is displayed on the output block 57.

Figure 9:
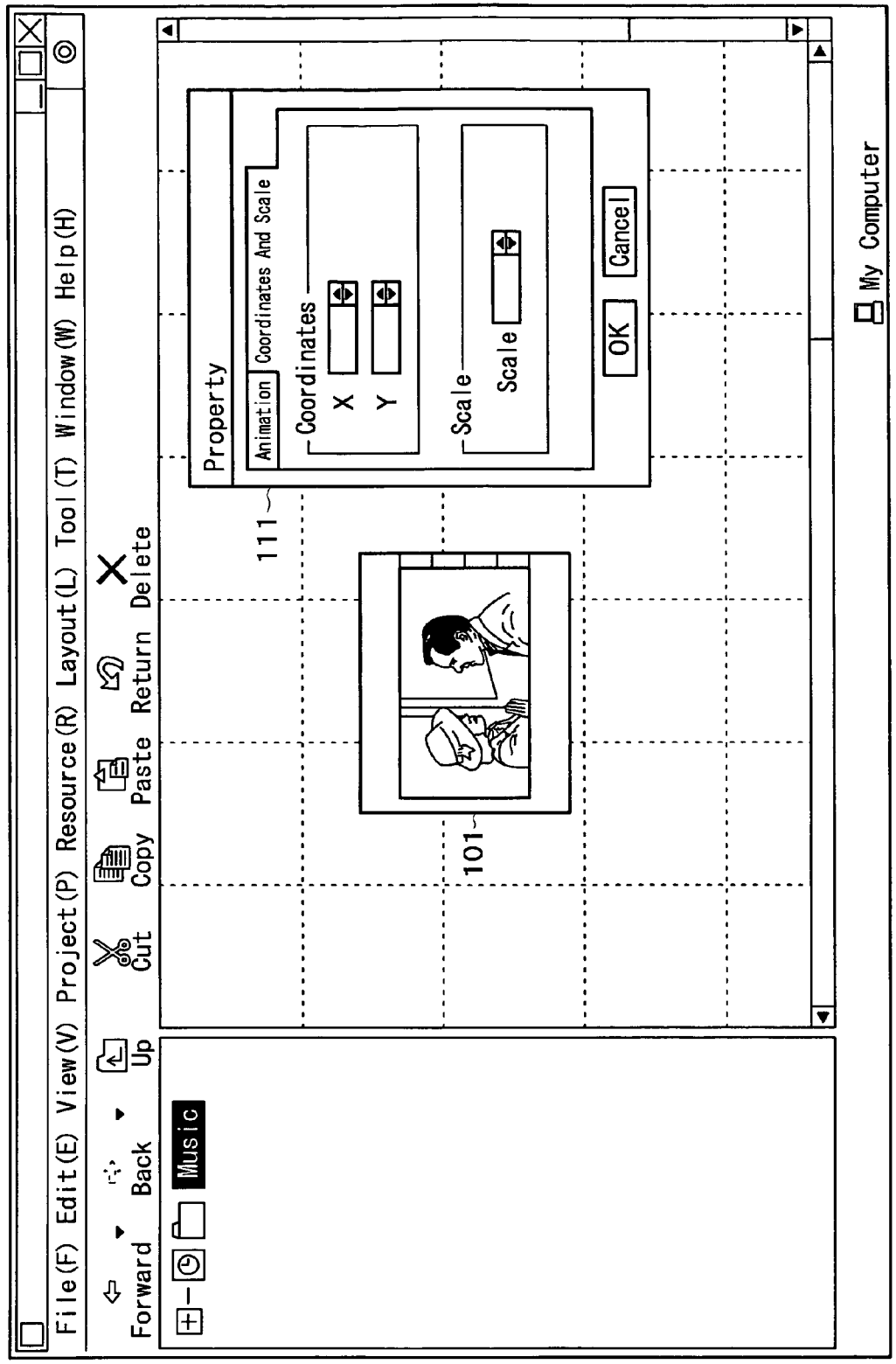
FIG. 9 is a diagram illustrating an exemplary display of a property screen displayed on the contents editing screen shown in FIG. 8.

The user lays out contents 101 to a desired position by operating the mouse for example or displays a property screen 111 as shown in FIG. 9, on which the user lays out the contents by entering its coordinates for example.

For example, when laying out the contents 101 to a desired position by use of the mouse for example, the user drags and drops (by selecting an image, moving the selected image to a desired position, and deselecting the image at that position) the contents 101 to that position and zooms in or out as necessary, by which the edited results (the editing history) are held in the authoring software 21.

In addition, for example, when entering an initial position by displaying the property screen 111 as shown in FIG. 9, the user activates a tab named "Coordinates And Scale" and enters the x and y coordinates and a scaling value (scale of zoom-in/zoom-out) as required, by which the edited results are held in the authoring software 21.

When laying out the contents just laid out to another desired position, the user determines the laid out position and size of the contents 101 by use of the mouse for example or by entering the numerals.

Figure 10:
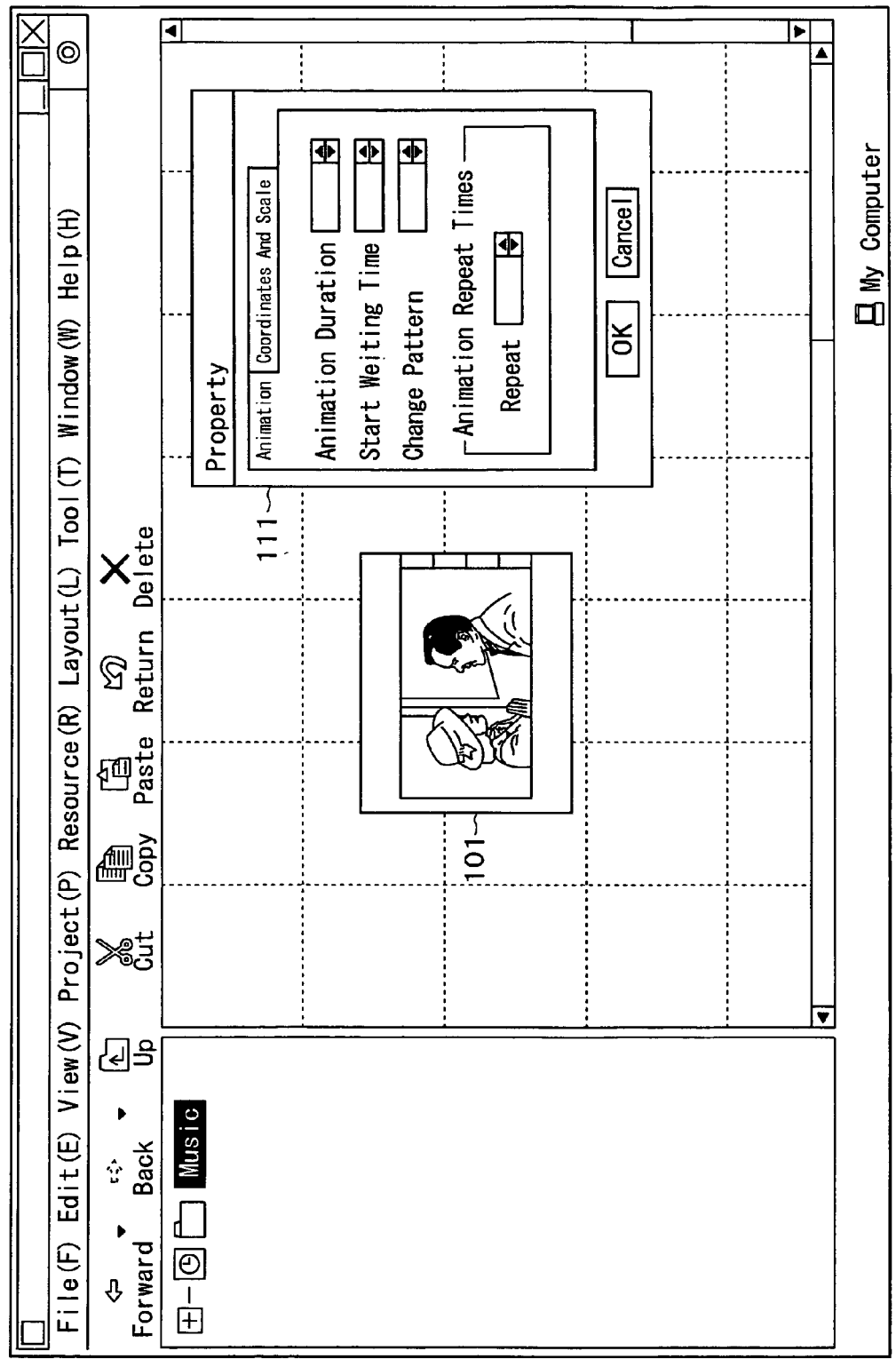
FIG. 10 is a diagram illustrating an exemplary display of another property screen displayed on the contents editing screen shown in FIG. 8.

For example, when laying out the contents 101 by entering the numerals, the user activates a tab titled "Animation" in the property screen 111 shown in FIG. 10 and enters the duration of animation (a time required for movement), start waiting time, change pattern, and repeat of animation as required, by which the edited results are held in the authoring software 21.

When the editing by of the contents 101 has been completed and the user gives an instruction for the storage of the contents data, the CPU 51 which is executing the authoring software 21 automatically converts the edited contents data into a markup language document as instructed by the user and stores the markup language document into the hard disk drive 59.

Referring to FIG. 11, there is shown an example of a part of the markup language document (XML document) stored in the hard disk drive 59.

In a range from <frame picture="f02_01.bmp" X="150" Y="50" scale="1.000000"> on line 2 to </frame> on line 9, there is the description about a frame (image) having file name f02_01.bmp with the x coordinate and y coordinate of top left being 150 mm and 50 mm respectively and the scaling value being 1.000000.

In a range from <action> on line 3 to </action> on line 8, there is the description about an operation (editing history) for moving an image of which frame name is f02_01.bmp.

<transformAction X="0" y="50" scale="2.000000" duration="200" animetionType=&LINEAR;" wait="50" repeat="1"/> on lines 4 and 5 denotes that the image linearly (LINEAR) moves, in 200 ms, to a predetermined position with x coordinate and y coordinates of top left point being 0 mm and 50 mm respectively, the scaling value after movement is 2.000000, the waiting time until the start of movement is 50 ms, and the repeat times of movement is 1.

<transformAction x="50" y="100" scale="0.750000" duration="50" animetionType=&SISO;" wait="0" repeat="1"/> on lines 6 and 7 denotes that the image moves in a Slow-in-Slow-out (SISO) manner, in 50 ms, to a predetermined position with x and y coordinates at to left point being 50 mm and 100 mm, the image of the scaling value after movement is 0.750000, the waiting time until the start of movement is 0 ms, and the repeat times of movement is 1.

Thus, contents data are converted into a markup language document by the authoring software 21 and stored in the hard disk drive 59.

Now, referring to FIG. 7 again, in step S2, the CPU 51 reads the markup language document from the hard disk drive 59 and sends it to the server 1 via the communication block 58 and the Internet 2 as instructed by the user.

In step S11, the CPU 31 of the server 1 receives the markup language document 12 supplied from the personal computer 3 via the Internet 2 and stores it into the hard disk drive 10.

In step S12, the CPU 31 reads the markup language document 12 stored in the 10 in step S11 when the markup language processing processor 11 is executed by the manager of the server 1, develops the markup language document 12 into the markup language document tree structure 13, and stores it into the hard disk drive 10.

Figure 12:
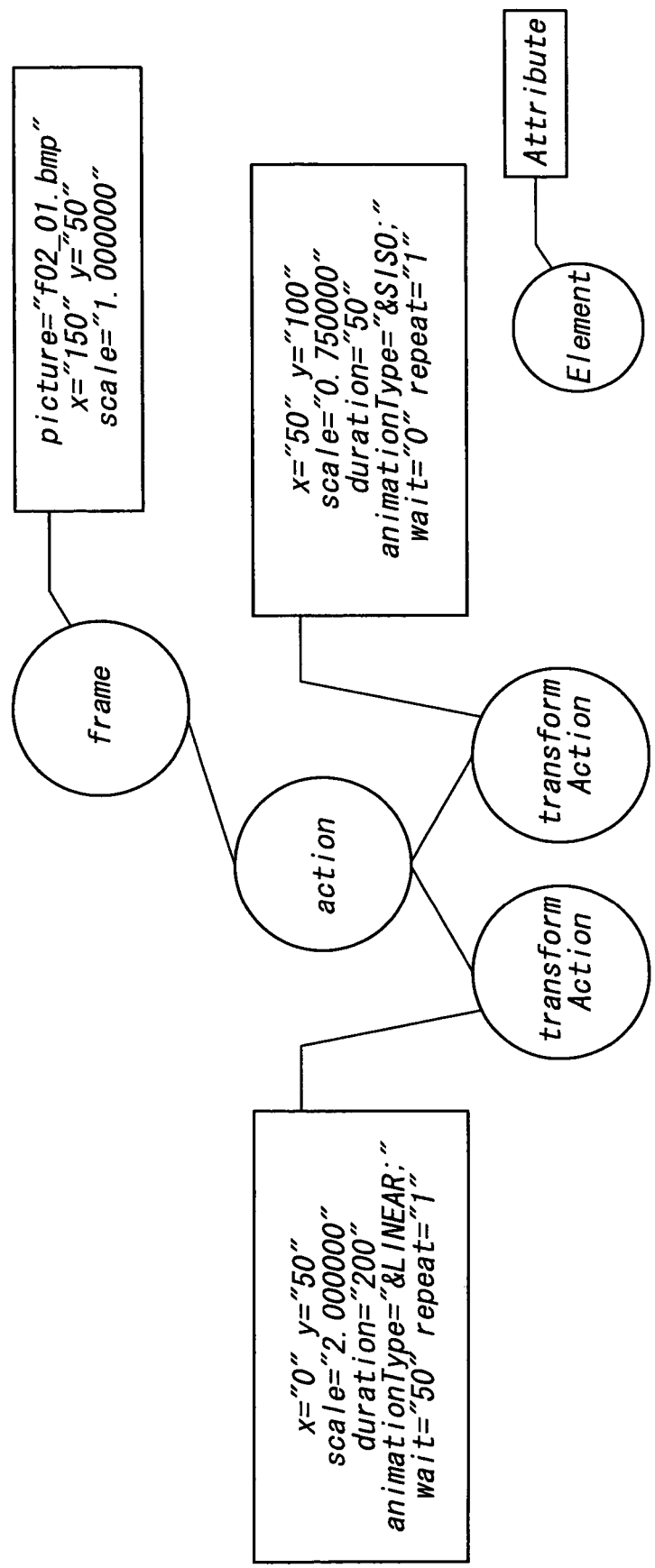
FIG. 12 is a diagram illustrating a mode in which development is made into the tree structure of a markup language document.

To be more specific, as shown in FIG. 12, a tag named "frame", which is the topmost tag, is linked down with a tag named "action", which is still linked down with two tags named "transformAction".

In the example shown in FIG. 12, tag "frame" (element) is entered with attributes ""picture="f02_01.bmp" x="150" y="50" scale="1.000000"" described on line 2 of the markup language document shown in FIG. 11. Tag "transformAction" shown to the left in FIG. 12 is entered with attributes "x="0" y="50" scale="2.000000" duration="200" animetionType=&LINEAR;" wait="50" repeat="1"" described on line 4 of the markup language document shown in the left in FIG. 11. Tag "transformAction" shown in the right in FIG. 12 is entered with attributes "x="50" y="100" scale="0.750000" duration="50" animetionType=&SISO;" wait="0" repeat="1"" described on line 6 of the markup language document shown in FIG. 11.

Thus, the markup language document 12 is developed into the a tree structure by the markup language processing processor 11 and stored in the hard disk drive 10 as the markup language document tree structure 13.

Referring to FIG. 7 again, in step S3, the CPU 51 of the personal computer 3 executes the markup language compliant browser 22 to request the server 1 for the distribution of the edited contents as instructed by the user.

In step S13, the CPU 31 of the server 1 determines whether or not the distribution of contents has been requested by the personal computer 3 and executes this determination processing until the request for a distribution of contents is made. When the distribution of contents is requested by the personal computer 3, the CPU 31 reads the corresponding markup language document tree structure 13 from the hard disk drive 10 and distributes it to the personal computer 3 via the Internet 2 in step S14.

In step S4, the personal computer 3 that is executing the markup language compliant browser 22 receives the markup language document tree structure 13 supplied from the server 1 via the Internet 2 and translates it into a program code suitable for the graphics engine 23.

Figure 13:
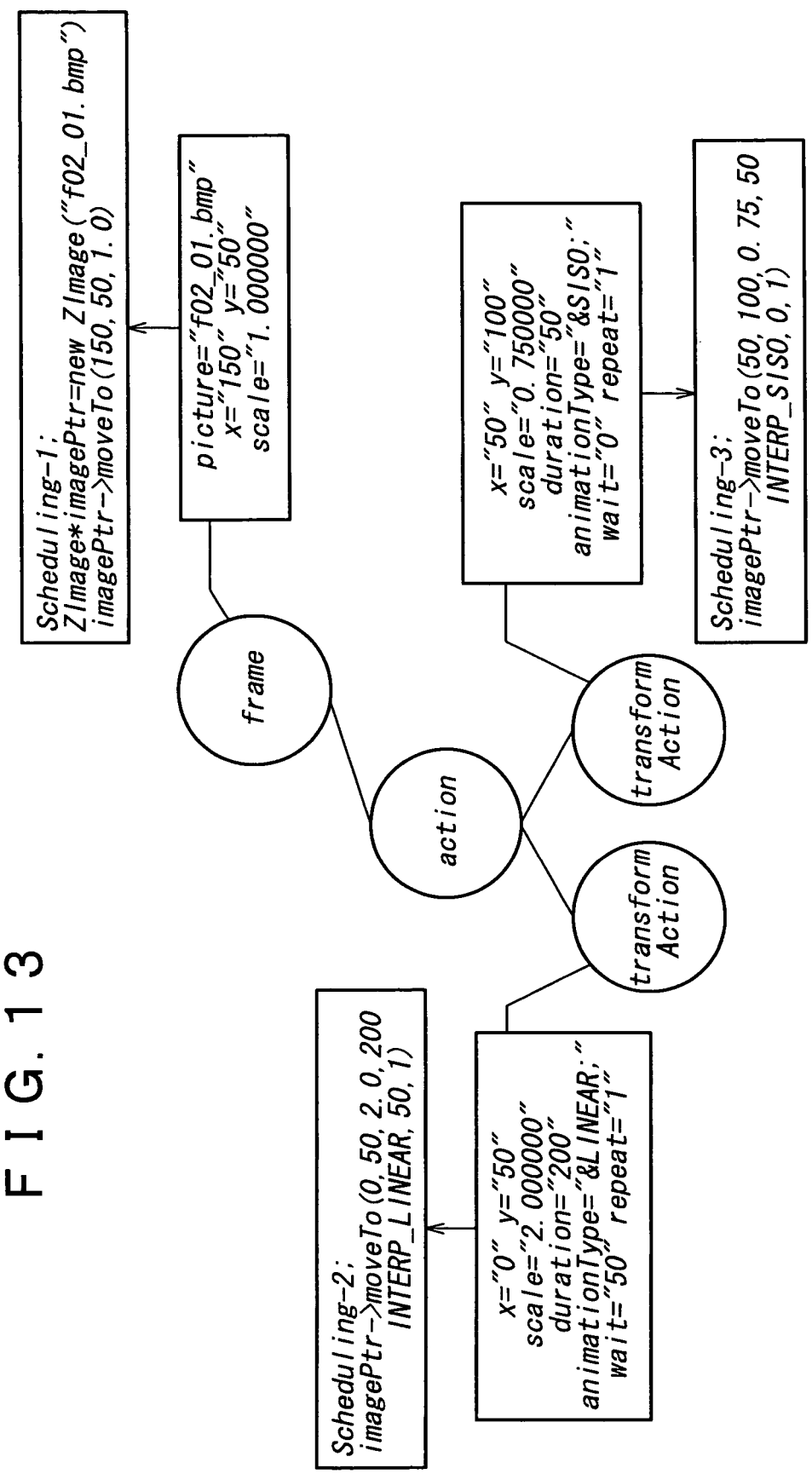
FIG. 13 is a diagram illustrating a mode in which translation is made into a tree-structure program code.

To be more specific, as shown in FIG. 13, attributes "picture="f02_01.bmp" x="150" y="50" scale="1.000000"" entered in tag "frame" shown in FIG. 12 are translated into program code "Scheduling-1: ZImage*imagePtr=new ZImage("f02_01.bmp") imagePtr-> moveTo(150,50,1.0)". Also, attributes "x="0" y="50" scale="2.000000" duration="200" animetionType=&LINEAR;" wait="50" repeat="1"" entered in tag "transformAction" shown in the left in FIG. 12 are translated into program code "Scheduling-2:imagePtr-> moveTo(0,50,2.0,200 INTERP_LINEAR,50,1)". Further, attributes "x="50" y="100" scale="0.750000" duration="50" animetionType=&SISO;" wait="0" repeat="1"" entered tag "transformAction" shown in the right in FIG. 12 are translated into program code "Scheduling-3:imagePtr-> moveTo(50,100,0.75,50 INTERP_SISO,0,1)".

Thus, the markup language document tree structure 13 is translated by the markup language compliant browser 22 into program codes suitable for the graphics engine 23.

Referring to FIG. 7 again, in step S5, the CPU 51 executes, on the graphics engine 23, each program code translated in step S4. Consequently, the corresponding contents are displayed on the output block 57 as shown in FIGS. 14A through 14C.

Figure 14A:
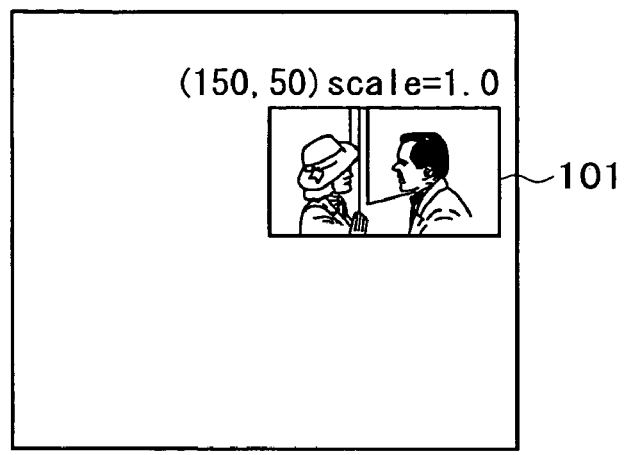
FIG. 14A is a diagram illustrating a mode in which the contents are displayed when a program code is executed.
Figure 14B:
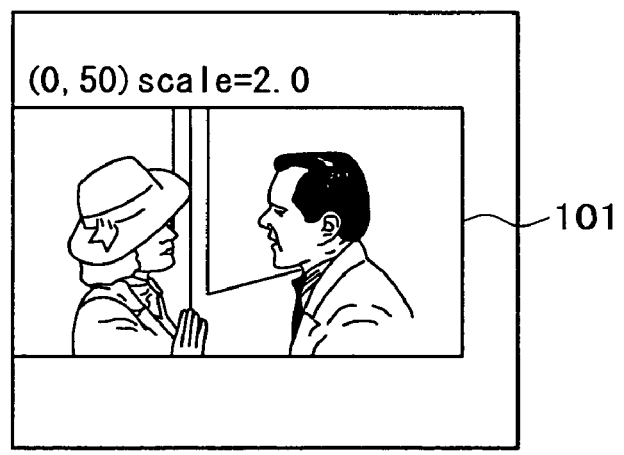
FIG. 14B is a diagram illustrating another mode in which the contents are displayed when a program code is executed.
Figure 14C:
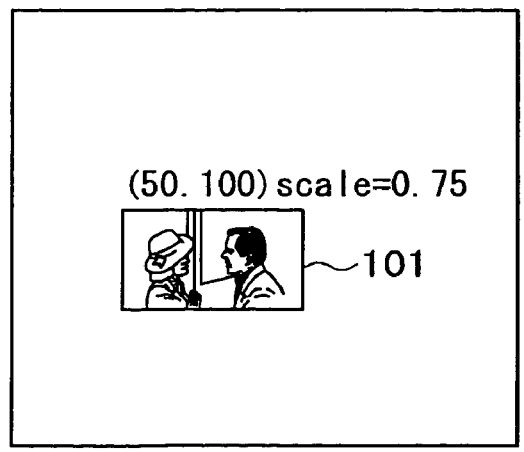
FIG. 14C is a diagram illustrating still another mode in which the contents are displayed when a program code is executed.

To be more specific, as shown in FIG. 14A, the contents 101 is laid out at an initial position with x coordinate being 150 mm and y coordinate being 50 mm, the scaling value at this moment being 1.0. Next, the contents are linearly (LINEAR) moved after 50 ms in 200 ms to a position with x coordinate being 150 mm and y coordinate being 50 mm, the scaling value at this moment being 2.0. Next, in the Slow-in-Slow-out manner, the contents are moved immediately (namely, the waiting time before the start of movement is 0 ms) in 50 ms to a position with x coordinate being 50 mm and y coordinate being 100 mm, the scaling value at this moment being 0.75 as shown in FIG. 14C.

Thus, the markup language document supplied from the server 1 is translated by the markup language compliant browser 22 into program codes suitable for the graphics engine 23, which are outputted to the output block 57.

As described above, the contents edited by the user by use of the authoring software 21 is automatically converted into a markup language document, which is developed into a tree structure in the server 1, so that the edited contents may be distributed without restriction independently of platforms and program languages.

In the above description, the personal computer 3 is used by way of example as a platform on which the authoring software 21 is executed. It will be apparent that the platforms also include other information processing apparatuses such as portable telephones or PDAs (Personal Digital Assistants) for example on which the authoring software 21 can be executed.

For example, if a portable telephone is used for the above-mentioned execution of the processing, a compact HTML browser is used as the markup language compliant browser, in which the markup language document tree structure 13 supplied from the server 1 is translated into a program code which can operate on the graphics engine of the portable telephone and the program code is executed, thereby displaying the corresponding contents.

The above-mentioned sequence of processing operations may be executed not only by hardware but also by software.

In the software approach, the programs constituting the software are installed from a program storage medium into a computer incorporated in a dedicated hardware apparatus or a general-purpose personal computer for example that is able to execute various functions by installing various programs.

The recording media storing the above-mentioned software programs which are installed in a computer and made executable thereby may be constituted by a package medium made up of magnetic disk 41 or 61 (including flexible disks), optical disk 42 or 62 (including CD-ROM (Compact Disc-Read Only Memory) and DVD (Digital Versatile Disc), magneto-optical disk 43 or 63 (including MD (Mini-Disc) (trademark)), or semiconductor memory 44 or 64, or flash ROM 4 or the hard disk drive 10 or 59 in which the programs are stored temporarily or permanently. The recording of programs to the recording media is executed by use of wired or wireless communication media such as public line networks, local area networks, the Internet 2, or digital satellite broadcasting systems via the communication block 36 or 58 based on a rooter and a modem.

It should be noted herein that the steps for describing each program recorded in recording media include not only the processing operations that are sequentially executed in a time-series manner but also the processing operations that are executed concurrently or discretely.

It should be noted that the term system as used herein denotes an entire apparatus constituted by a plurality of apparatuses.

INDUSTRIAL APPLICABILITY

According to a first aspect of the present invention, when contents are edited and the edited contents are stored, the edited contents are converted into a predetermined description language, which is then stored, so that the contents edited by users may be distributed without restriction.

According to a second aspect of the present invention, when an information processing apparatus edits contents and stores the edited contents, the contents are converted into a predetermined description language, the resultant contents written in the predetermined description language being sent to an information distribution apparatus. The information distribution apparatus receives and stores the contents written in the predetermined description language from the information processing apparatus, develops the stored contents written in the predetermined description language into a tree structure, and distributes the tree-structured contents written in the predetermined description language to the information processing apparatus, so that the common contents may be distributed to users independently of platforms.

The invention claimed is:

1. An information processing apparatus comprising:
 editing means for editing contents;
 converting means for converting said contents, when storing said contents edited by said editing means, into a predetermined description language;
 storage means for storing said contents written in said predetermined description language, said contents being converted by said converting means;
 translating means for requesting from another information processing apparatus the distribution of said contents, receiving said predetermined description language developed into a tree structure from said another information processing apparatus, and translating the received predetermined description language into a predetermined program code,
 wherein the predetermined program code is edited by the editing means such that the edited predetermined program code is automatically converted into another predetermined description language, said another predetermined description language stored in said storage means; and
 transmitting means for transmitting said stored another predetermined description language to said another information processing apparatus, wherein said another information processing apparatus develops said transmitted another predetermined description language into another tree structure.

2. The information processing apparatus according to claim 1, wherein said editing means stores an editing history for said contents and said converting means converts said editing history stored in said editing means into said predetermined description language.

3. The information processing apparatus according to claim 1, still further comprising:
 display means for executing said predetermined program code translated by said translating means to display said corresponding contents.

4. The information processing apparatus according to claim 1, wherein said predetermined description language is an XML language.

5. An information processing method comprising the steps of:
 editing contents;
 converting said contents, when storing said contents edited by said editing step, into a predetermined description language;
 controlling the storage of said contents written in said predetermined description language, said contents being converted by said converting step;
 requesting the distribution of said contents from another information processing apparatus;
 receiving said predetermined description language developed into a tree structure from said another information processing apparatus;
 translating the received predetermined description language into a predetermined program code,
 wherein the predetermined program code is edited by the editing means such that the edited predetermined program code is automatically converted into another predetermined description language;
 storing said another predetermined description language; and
 transmitting said stored another predetermined description language to said another information processing apparatus, wherein said another information processing apparatus develops said transmitted another predetermined description language into another tree structure.

6. A recording medium recording a computer-readable program comprising the steps of:
 editing contents;
 converting said contents, when storing said contents edited by said editing step, into a predetermined description language;
 controlling the storage of said contents written in said predetermined description language, said contents being converted by said converting step;
 requesting the distribution of said contents from another information processing apparatus;
 receiving said predetermined description language developed into a tree structure from said another information processing apparatus;

translating the received predetermined description language into a predetermined program code,
wherein the predetermined program code is edited by the editing means such that the edited predetermined program code is automatically converted into another predetermined description language;

storing said another predetermined description language; and transmitting said stored another predetermined description language to said another information processing apparatus, wherein said another information processing apparatus develops said transmitted another predetermined description language into another tree structure.

7. An information processing system including an information processing apparatus for editing contents and an information distribution apparatus for distributing said contents, said information processing apparatus comprising:

editing means for editing contents;

converting means for converting, when storing said contents edited by said editing means, converting said contents into a predetermined description language; and transmitting means for transmitting said contents written in said predetermined description language to said information distribution apparatus, and said information distribution apparatus comprising:

storage means for receiving and storing said contents written in said predetermined description language sent from said information processing apparatus;

developing means for developing said stored contents written in said predetermined description language into a tree structure; and distributing means for distributing, to said information processing apparatus, said contents written in said predetermined description language having said tree structure developed by said developing means, wherein said information processing apparatus comprises:

translating means for translating the received predetermined description language having said tree structure into a predetermined program code, wherein the predetermined program code is edited by said editing means such that the edited predetermined program code is automatically converted into another predetermined description language; and transmitting means for transmitting said another predetermined description language to said another information processing apparatus, wherein said another information processing apparatus develops said transmitted another predetermined description language into another tree structure.

8. The information processing system according to claim 7, wherein said information processing apparatus further comprises:

display means for executing said predetermined program code translated by said translating means to display said corresponding contents.

* * * * *